No. 837,108. PATENTED NOV. 27, 1906.
M. OTTO.
WATER STERILIZING APPARATUS.
APPLICATION FILED OCT. 19, 1905.
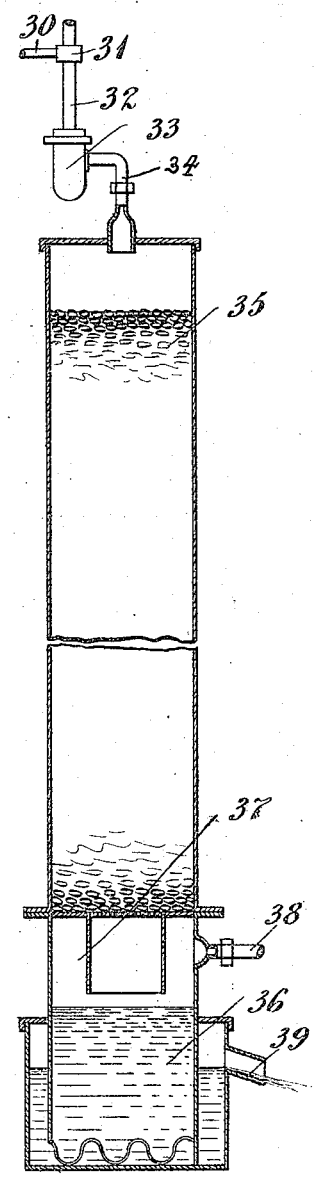

UNITED STATES PATENT OFFICE.

MARIUS OTTO, OF PARIS, FRANCE, ASSIGNOR TO AMERICAN OZONE COMPANY, OF NIAGARA FALLS, NEW YORK, A CORPORATION OF NEW YORK.

WATER-STERILIZING APPARATUS.

No. 837,108.   Specification of Letters Patent.   Patented Nov. 27, 1906.

Application filed October 19, 1905. Serial No. 283,470.

*To all whom it may concern:*

Be it known that I, MARIUS OTTO, a citizen of the Republic of France, and a resident of Paris, France, have invented certain new and useful Improvements in Water-Sterilizing Apparatus, of which the following is a specification.

The object of my invention is to provide an improved apparatus for effecting the thorough mixture of ozone and water, thereby increasing the sterilization of the water.

The construction involved in my invention comprises an emulsifier and a Gay-Lussac column, together with other details, all of which will be clearly understood from the description of my invention with reference to the accompanying drawing.

I have shown in the drawing one form of the apparatus constructed in accordance with my invention.

In the form of apparatus shown in the drawing the ozone-supply pipe 30 supplies ozone to the water entering the apparatus by the water-pipe 31, and a pipe 32 carries the water and ozone to an emulsifier 33. The ozone and water are mixed together in the emulsifier and discharged through a pipe 34 upon the top of the Gay-Lussac column 35. Passing down through the Gay-Lussac column the water is finely divided, so that the ozone carried along comes into intimate contact with the water and effects its sterilization. Arriving at the bottom of the Gay-Lussac column, the sterilized water falls into a hydraulic seal 36, in the descending leg of which the unused ozone has an opportunity to free itself and, rising into the chamber 37, finds an escape at the pipe 38. The sterilized water after being freed of the unused ozone is discharged through an outlet 39 from the apparatus ready for consumption.

It is obvious that some suitable sterilizing-gas other than ozone or ozonized air might be employed without departing from the spirit of my invention.

Having thus described my invention, the following is what I claim as new therein and desire to secure by Letters Patent:

1. In a water-sterilizing apparatus, the combination with an emulsifier, means for supplying water thereto, and means whereby the water-supplying means draws in ozone; of a sterilizing-column receiving water and all of the ozone from said emulsifier, a separating-chamber below said sterilizing-column, an external discharge for the excess ozone therefrom, and a discharge for the sterilized water.

2. In a water-sterilizing apparatus, the combination with an emulsifier, means for supplying water thereto, and means whereby the water-supplying means draws in ozone; of a sterilizing-column receiving water and all of the ozone from said emulsifier, a hydraulic seal receiving mixed ozone and water from the sterilizing-column, means for externally discharging the excess ozone from said hydraulic seal, and means for discharging the sterilized water.

3. In a water-sterilizing apparatus, the combination with an emulsifier, means for supplying water thereto, and means whereby the water-supplying means draws in ozone; of a Gay-Lussac column receiving water and all of the ozone from said emulsifier, a separating-chamber below said Gay-Lussac column, a direct external discharge for the excess ozone therefrom, and a discharge for the sterilized water.

4. In a water-sterilizing apparatus, the combination with an emulsifier, means for supplying water thereto, and means whereby the water-supplying means draws in ozone; of a Gay-Lussac column receiving water and all of the ozone from said emulsifier, a hydraulic seal receiving mixed ozone and water from the Gay-Lussac column, direct means for externally discharging the excess ozone from said hydraulic seal, and means for discharging the sterilized water.

MARIUS OTTO.

Witnesses:
FREDERIC CAULDWELL,
LOUIS GARDET.